United States Patent
Brombach et al.

(10) Patent No.: US 12,480,473 B2
(45) Date of Patent: Nov. 25, 2025

(54) DYNAMIC WIND-ENERGY PLANT

(71) Applicant: Wobben Properties GmbH, Aurich (DE)

(72) Inventors: Johannes Brombach, Berlin (DE); Isabel Blaak, Alfter (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/285,296

(22) PCT Filed: Oct. 14, 2019

(86) PCT No.: PCT/EP2019/077731
§ 371 (c)(1),
(2) Date: Apr. 14, 2021

(87) PCT Pub. No.: WO2020/078876
PCT Pub. Date: Apr. 23, 2020

(65) Prior Publication Data
US 2021/0301786 A1    Sep. 30, 2021

(30) Foreign Application Priority Data
Oct. 15, 2018    (DE) .................... 10 2018 125 529.2

(51) Int. Cl.
F03D 7/00    (2006.01)
F03D 7/02    (2006.01)
(Continued)

(52) U.S. Cl.
CPC .......... F03D 7/048 (2013.01); F03D 7/0284 (2013.01); F03D 9/257 (2017.02);
(Continued)

(58) Field of Classification Search
CPC .......... Y02E 10/72; Y02E 10/76; H02J 3/004; H02J 3/381; H02J 2203/10; H02J 2300/28;
(Continued)

(56) References Cited

U.S. PATENT DOCUMENTS

2002/0087234 A1* 7/2002 Lof .................... G06Q 50/06
                                                          700/297
2005/0042098 A1   2/2005 Wobben
(Continued)

FOREIGN PATENT DOCUMENTS

CN    101542864 A    9/2009
CN    106537759 A    3/2017
(Continued)

*Primary Examiner* — Julio C. Gonzalez
(74) *Attorney, Agent, or Firm* — Seed Intellectual Property Law Group LLP (57) ABSTRACT

A method for controlling an electricity distribution grid having a nominal grid voltage, in particular in a critical grid situation, wherein a grid control center is provided for controlling the electricity distribution grid and the electricity distribution grid has at least one control region that comprises a plurality of mutually geographically separate wind farms, comprising the steps of: querying power outputs available from the wind farms, in particular on the basis of a weather forecast; defining a control node within the control region, in particular on the basis of the queried available power out-puts, preferably performed by the grid operator; combining a number of wind farms at the calculated control node to form a wind power plant on the basis of the queried available power outputs and/or a probability distribution of the available power output; controlling the wind power plant, in particular through the grid control center, by way of a wind power plant control unit, such that a required voltage quality and/or frequency stability and/or uninterrupted availability is provided in the control region.

16 Claims, 7 Drawing Sheets

(51) Int. Cl.
*F03D 7/04* (2006.01)
*F03D 9/25* (2016.01)

(52) U.S. Cl.
CPC . *F05B 2220/706* (2013.01); *F05B 2260/8211* (2013.01); *F05B 2270/1033* (2013.01); *F05B 2270/1071* (2013.01); *F05B 2270/335* (2013.01); *F05B 2270/337* (2013.01)

(58) Field of Classification Search
CPC .... H02J 2300/10; F03D 7/048; F03D 7/0284; F03D 9/257; F05B 2220/706; F05B 2260/8211; F05B 2270/1033; F05B 2270/1071; F05B 2270/335; F05B 2270/337
See application file for complete search history.

(56) References Cited

U.S. PATENT DOCUMENTS

| | | |
|---|---|---|
| 2009/0254223 A1 | 10/2009 | Helle et al. |
| 2012/0010755 A1 | 1/2012 | Stapelfeldt |
| 2012/0130556 A1 | 5/2012 | Marhoefer |
| 2015/0003945 A1 | 1/2015 | Takahashi et al. |
| 2015/0345468 A1 | 12/2015 | Schubert |
| 2016/0131109 A1 | 5/2016 | Busker |
| 2017/0054301 A1 | 2/2017 | Fintzos et al. |
| 2019/0036344 A1* | 1/2019 | Beekmann ................ H02J 3/38 |
| 2021/0301786 A1 | 9/2021 | Brombach et al. |

FOREIGN PATENT DOCUMENTS

| | | | |
|---|---|---|---|
| CN | 107332241 A | 11/2017 | |
| DE | 10 2012 210 613 A1 | 12/2013 | |
| DE | 10 2013 222 277 A1 | 9/2014 | |
| DE | 10 2015 102 430 A1 | 8/2016 | |
| DE | 102016105662 A1 * | 10/2017 | ............... F03D 7/00 |
| DE | 102018125529 A1 | 4/2020 | |
| WO | 03/030329 A1 | 4/2003 | |
| WO | 2016/120240 A1 | 8/2016 | |
| WO | 2019/178146 A1 | 9/2019 | |
| WO | 2020/226639 A1 | 11/2020 | |

* cited by examiner

DYNAMIC WIND-ENERGY PLANT

BACKGROUND

Technical Field

The present invention relates to a method for controlling an electricity distribution grid, in particular by way of a plurality of wind farms, and to such wind farms.

Description of the Related Art

Electricity distribution grids, such as for example the German transmission grid or the European integrated grid, usually have a plurality of generators and consumers.

In order to be able to better regulate the load flow between the generators and the consumers, electricity distribution grids are therefore often divided geographically into control areas and assigned to individual operators, what are known as the grid operators.

This results in particular in each control area being fixedly defined in itself, and in particular having a fixed generator-consumer structure.

These control areas or these sections of the electricity distribution grid are then regulated in actual terms by way of what is known as a grid control center, which is essentially designed to control the generators in the control area.

One disadvantage here is in particular the fixed structure, which, especially with regard to renewable energy, does not utilize the full potential of the electricity distribution grid.

The German Patent and Trademark Office has searched the following prior art in the priority application relating to the present application: WO 2016/120240 A1, DE 10 2013 222 277 A1, DE 10 2015 102 430 A1 and US 2015/0039 45 A1.

BRIEF SUMMARY

Provided are techniques for improved controllability of an electricity distribution grid by way of wind farms.

Provided is a method for controlling an electricity distribution grid having a nominal grid voltage, in particular in a critical grid situation, wherein a grid control center is provided for controlling the electricity distribution grid and the electricity distribution grid has at least one control region that comprises a plurality of mutually geographically separate wind farms, comprising the steps of: querying power outputs available from the wind farms, in particular on the basis of a weather forecast; defining a control node within the control region, in particular on the basis of the queried available power outputs, preferably performed by the grid operator; combining a number of wind farms at the calculated control node to form a wind power plant; controlling the wind power plant, in particular through the grid control center, by way of a wind power plant control unit, such that a required voltage quality and/or frequency stability and/or uninterrupted availability is provided in the control region.

A method for controlling an electricity distribution grid is therefore in particular proposed. The electricity distribution grid may also be referred to as a power grid or be part of a power grid. The electricity distribution grid however in particular comprises at least a plurality of generators and consumers that are connected together via a network of electrical power lines. The electricity distribution grid also has a nominal grid voltage and is preferably controlled or regulated by a grid operator by way of at least one control region and a grid control center. By way of example, the electricity distribution grid is a control region that is regulated by the operator of the electricity distribution grid by way of a grid control center. The control region itself in turn has a plurality of geographically separate wind farms. The wind farms in turn comprise a plurality of wind power installations that generate an electric power output and feed it into the electricity distribution grid or the control region by way of a common wind farm grid.

In a first step of the method, a power output available from the wind farms is first of all queried. This may be performed for example by the grid operator by way of the grid control center, which is connected for example to the wind farm control units of the wind farms. To this end, the wind farms preferably make available a forecast of a future available power output, taking into account a weather forecast. The grid operator thus asks all of the wind farms in its control region how much electric power output they are able to make available in the next few hours, taking into account the weather.

Depending on this queried available power output, the grid operator then defines for example a control node or calculates same. In other words, the grid operator for example performs a load flow calculation for its control region, taking into account the available power output, and on the basis thereof, searches for an operationally optimal control node for its control region.

A suitable number of wind farms is then selected, in particular taking into account the control node, and combined to form a wind power plant. The wind farms are in this case combined in particular dynamically, that is to say that different wind farms together form the wind power plant for a certain time during ongoing operation of the electricity supply grid. This also means in particular that the control region has at least one control node on which the wind power plant operates. The wind farms of the wind power plant therefore preferably regulate to this control node, a specific grid point within the control region. Put simply, the wind farms of the wind power plant form a virtual power plant, specifically the wind power plant. The wind power plant may therefore also be understood to be a virtual power plant in the sense of a functional unit.

This wind power plant is then regulated in particular by the grid operator or the grid control center of the grid operator by way of a wind power plant control unit. This wind power plant control unit may for example be a control unit that is part of the grid control center and is connected to the wind farm control units of the wind farms.

The wind power plant is preferably controlled in this case by way of the wind power plant control unit such that a required voltage quality and/or frequency stability and/or uninterrupted availability is provided in the control region.

It is important to understand in this case in particular that the method is not aimed at operating two neighboring wind farms together with one another in a fixed manner, but rather at combining operationally mutually independent wind farms in a grid-critical situation to form a virtual wind power plant that regulates to a specific point in the control area, the control node.

The wind power plant is thus in particular a virtual and dynamically changing wind power plant, comprising a plurality of geographically separate wind farms, which is activated in particular for critical grid situations.

A critical grid situation in particular also comprises any markets, such as for example the market for control power, being deactivated or switched off, that is to say in particular that any electricity trading no longer has any influence on the power generation and power control within the electricity distribution grid or the control area.

In one preferred embodiment, the wind power plant comprises at least three wind farms, at least two wind farms of which are spaced apart by a cable length of at least 10 km.

In one preferred embodiment, the electricity supply grid is a medium-voltage grid or a high-voltage grid, in particular having a nominal grid voltage of greater than 10 kV, preferably 20 kV, particularly preferably 50 kV.

The number of wind farms are preferably combined on the basis of a predefined minimum power output with a minimum availability, preferably wherein the predefined minimum power output depends on a size of the control region.

It is therefore proposed in particular, for the wind power plant, to predefine a minimum power output of for example 50 MW that has to be provided by the wind farms, which are combined at a control node to form a wind power plant, taking into account for example 95 percent availability.

The minimum power output is in this case preferably predefined taking into account the size of the control region, for example 5 GW.

It is therefore in particular also proposed to take into account the size of the control region for the size of the wind power plant.

The size of the wind power plant may also be changed depending on the situation, in particular on the basis of the status of the electricity distribution grid or of the control region. By way of example, the grid operator may thus define one or more wind power plants, in an early phase of the grid re-establishment, that is to say for example with a smaller live grid region, which provide for example a guaranteed power output of 20 MW. In a later phase, that is to say with a larger live grid region, the grid operator may then combine wind farms with a guaranteed power output of for example 100 MW to form a wind power plant.

In addition, it is in particular also proposed, starting from a certain size of the electricity distribution grid, for example 20 GW, to use multiple control areas and/or multiple wind power plants and optionally also multiple control nodes.

The control node is preferably defined dynamically and, in addition or as an alternative, the number of wind farms are combined dynamically at the calculated control node to form the wind power plant.

It is therefore proposed in particular for the method described above or below to be carried out continuously and/or iteratively, specifically preferably such that the wind farms are switched between dynamically to form the wind power plant. By way of example, the control region contains four wind farms, the first and second wind farms of which are combined to form the wind power plant. After an indefinite period of time, however, it may be more advantageous for example for the second and the third wind farms to form the wind power plant. The method takes this into account.

A critical grid situation is preferably a situation from the following list, comprising: voltage drop, voltage failure, transient process, system split, underfrequency, overfrequency.

Although the method is suitable for all grid statuses of the electricity distribution grid, that is to say for example the safe grid status, it is in particular proposed to use the method in critical grid statuses or grid situations, that is to say those in which there is a high risk of extensive power outages and immediate actions, such as for example splitting the electricity distribution grid into individual sub-grids, are necessary, for example what is known as the system split.

Examples of these are the voltage drop, that is to say when the grid voltage of the electricity distribution grid is less than 0.9 p.u. of the nominal grid voltage, the voltage failure, that is to say when the grid voltage of the electricity distribution grid is less than 0.1 p.u. of the grid voltage, the transient process, that is to say a transient or unstable grid process, the underfrequency, that is to say in particular when the grid frequency is below 0.98 p.u. of the nominal grid frequency, or the overfrequency, that is to say in particular when the grid frequency is above 1.02 p.u. of the nominal grid frequency.

A critical grid situation in particular also comprises any markets, such as for example the market for control power, being deactivated or switched off, that is to say in particular that any electricity trading no longer has any influence on the power generation and power control within the electricity distribution grid or the control area.

It is also conceivable to use other criteria or for the grid control center to decide that a critical status has occurred or else should be expected. By way of example, this may be triggered by weather conditions, failed lines, failed power plants or else overloaded equipment.

The electricity distribution grid is preferably controlled in order to generate a stable voltage in the control area that is between 90 and 110 percent or 0.9 and 1.1 p.u. of the nominal grid voltage.

It is therefore also proposed in particular to control the wind power plant such that the electricity distribution grid or the control region has a stable voltage.

The wind power plant preferably has at least a rated power output of 100 MW, preferably 200 MW, more preferably 400 MW, and/or the wind power plant has at least a forecast actual power output of 40 MW, preferably 80 MW, more preferably 160 MW.

It is therefore proposed in particular for the wind farms to be combined such that the wind power plant has a certain size.

As a result, the method has in particular a greater influence on the system behavior of the electricity distribution grid or of the control region.

A wind farm of the wind power plant is preferably at most 100 km cable length away from another wind farm of the wind power plant, wherein the wind farms are in this case preferably galvanically connected to one another or are located in the same control region or are connected to the same superordinate grid level.

It is therefore proposed in particular to regionally limit the wind power plant.

Any losses between the individual wind power plants thereby have less of an influence on the controllability of the wind power plant.

If the electricity distribution grid has dimensions greater than for example a cable length of 100 km, it is furthermore proposed to control the electricity distribution grid with multiple control regions, as described above or below.

The available power outputs are preferably calculated on the basis of at least one weather forecast, in particular using a risk factor of less than 1, preferably using a probability distribution.

It is therefore proposed in particular for the available power outputs to be determined on the basis of a weather forecast and preferably a risk factor of for example 0.95, or using a probability distribution. To this end, for example, a probability distribution of the weather forecast may be used or a fixed probability funnel may be assumed.

It is thus proposed in particular to calculate a power output from a forecast and the probability distribution, which is 95% available over a period of for example 15 minutes.

In addition or as an alternative, a risk factor is also used. The wind farms thus create, for example on the basis of a weather forecast, an available power output for a predetermined period, for example 50 percent of the wind farm rated power output for the next 2 hours. A risk factor is then applied to this value, that is to say in this case 50 times 0.95. 47.5 percent of the wind farm rated power output for the next 2 hours is accordingly reported to the grid operator, that is to say 4.75 MW for the next 2 hours in the case of a 10 MW wind farm.

The wind farms are preferably combined or accordingly selected to form the wind power plant at least on the basis of a control region status and/or a control region size and/or a current control region load and/or a location of the control node.

It is therefore proposed in particular for the wind farms to be combined to form the wind power plant not only on the basis of the available power output, but rather for properties of the control region and/or the location of the control node also to be taken into account.

The number of wind farms that are combined to form the wind power plant is also preferably based on a control region status and/or a control region size and/or a current control region load and/or a location of the control node and on the basis of a wind power plant rated power output.

It is therefore also proposed in particular for the number of wind farms that form the wind power plant to be based on the properties of the control region. By way of example, in some cases, it may thus be advantageous, by way of example, for two 50 MW wind farms to be combined to form the wind power plant, and in other cases for four 25 MW wind farms to be combined.

Setpoint values are preferably predefined for controlling the wind power plant, in particular by the grid operator, comprising an active power and/or a reactive power and/or a setpoint frequency and/or active power/frequency statics and/or a setpoint voltage and/or reactive power/voltage statics.

It is thus proposed in particular for the wind power plant to be controlled by setpoint values, described above or below, in particular by the grid operator, for example by way of a grid control center that is connected to a wind power plant controller.

Further provided is a wind farm having a wind farm control unit that is designed to participate in a method, described above or below, for controlling an electricity distribution grid.

A wind power installation of such a wind farm is also proposed.

BRIEF DESCRIPTION OF THE SEVERAL VIEWS OF THE DRAWINGS

The present invention will now be explained in more detail below by way of example and on the basis of exemplary embodiments with reference to the accompanying figures, wherein the same reference symbols are used for similar or functionally identical components.

DETAILED DESCRIPTION

Figure 1:
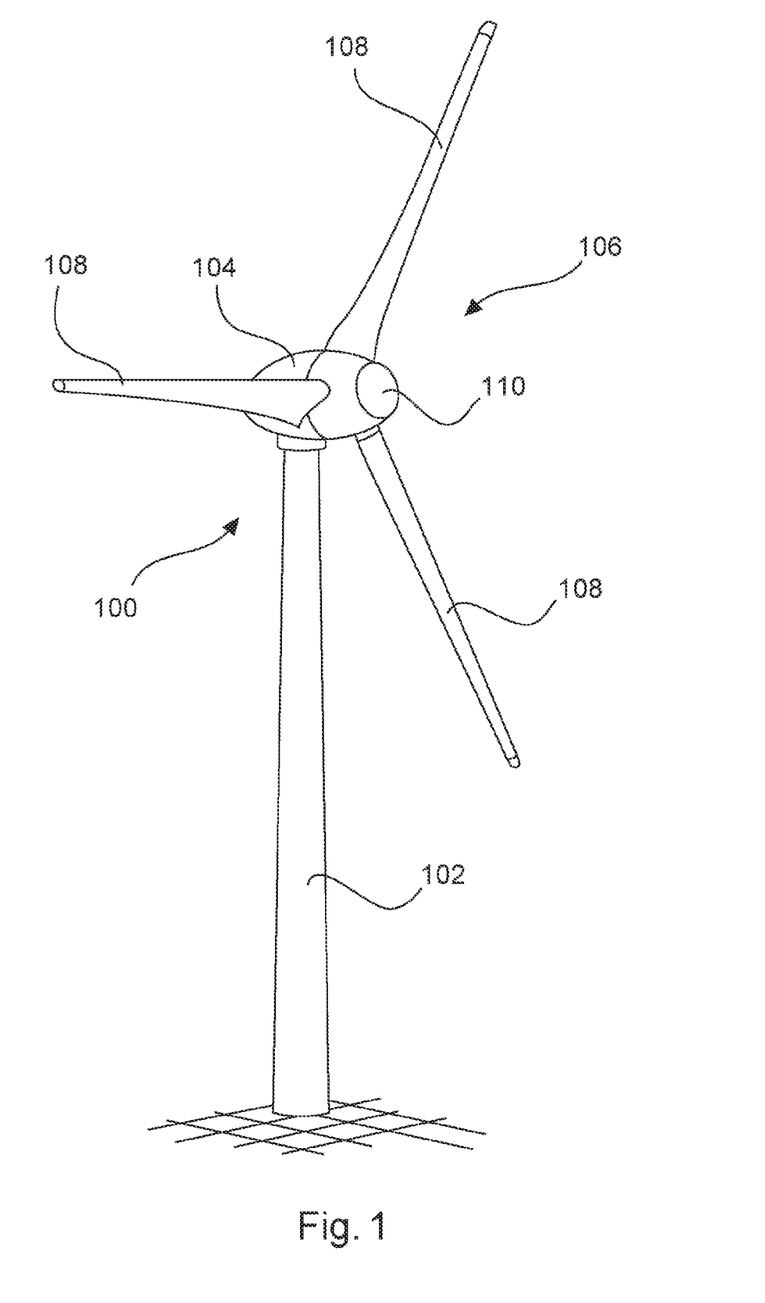
FIG. 1 shows a schematic view of a wind power installation according to the invention of a wind farm according to the invention in one embodiment.

FIG. 1 shows a wind power installation 100 of a wind farm according to the invention.

The wind power installation 100 to this end has a tower 102 and a nacelle 104. An aerodynamic rotor 106 having three rotor blades 108 and having a spinner 110 is arranged on the nacelle 104. The rotor 106 is set in a rotational movement by the wind during operation and thereby drives a generator in the nacelle 104. As a result, the generator generates a current that is fed, by way of a full converter, to a wind power installation transformer that is connected to a wind farm grid.

Figure 2:
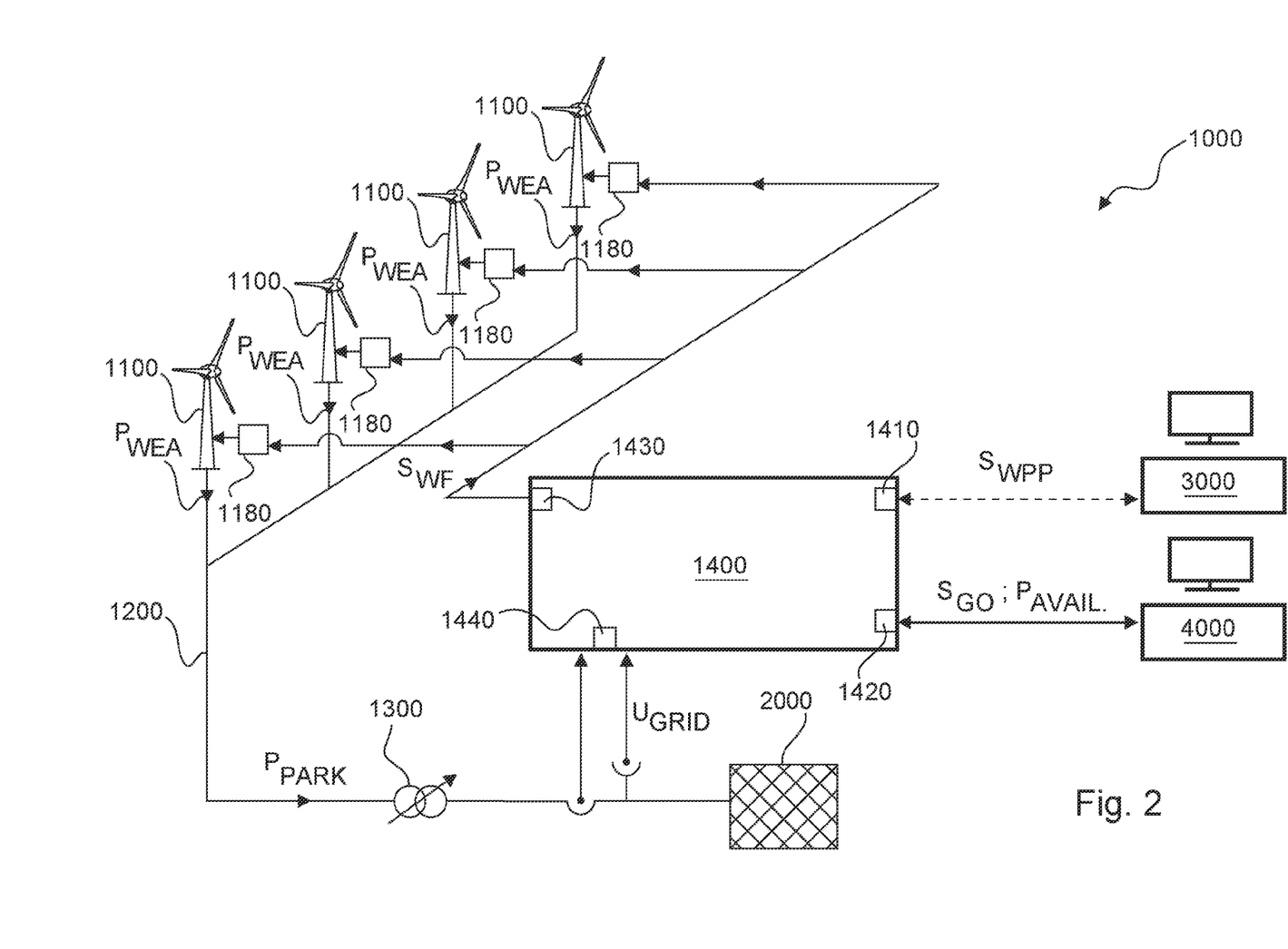
FIG. 2 shows a schematic structure of a wind farm according to the invention in one embodiment.

FIG. 2 shows a schematic structure of a wind farm 1000 according to the invention in one embodiment.

The wind farm 1000 comprises a plurality of wind power installations 1100, as shown by way of example in FIG. 1, which are connected to one another via a common wind farm grid 1200.

The wind farm grid 1200 is connected to an electricity distribution grid 2000 by way of a wind farm transformer 1300 in order to feed in an electric wind farm power output $P_{park}$, which consists of a sum of the individual electric wind power installation power outputs $P_{wea}$.

The wind farm 1000 furthermore has a wind farm control unit 1400 for controlling the wind farm 1000.

The wind farm control unit 1400 comprises a wind power plant interface 1410, a grid operator interface 1420 and a wind power installation interface 1430.

The wind power plant interface 1410 is designed at least to receive setpoint values $S_{WPP}$ from a wind power plant control unit 3000.

The grid operator interface 1420 is designed at least to receive setpoint values $S_{GO}$ from a grid control center 4000, in particular of the grid operator, and to transmit an available power output Pavail, in particular on the basis of a weather forecast, to the grid control center 4000.

The wind power installation interface 1430 is designed to transmit setpoint values SwF to the wind power installations 1100 of the wind farm 1000, for example active power setpoint values, in order to control the wind farm 1000 and in particular the electric wind farm power output $P_{park}$.

To this end, the wind power installations 1100 each have at least one wind power installation control unit 1180, which receive the setpoint values SwF from the wind farm control unit 1400 and are designed to be operated at least with a set of operating parameters.

The wind farm control unit 1400 preferably also has a grid monitoring system 1440 that is designed to record at least one grid variable, such as for example the grid voltage $U_{grid}$.

Figure 3:
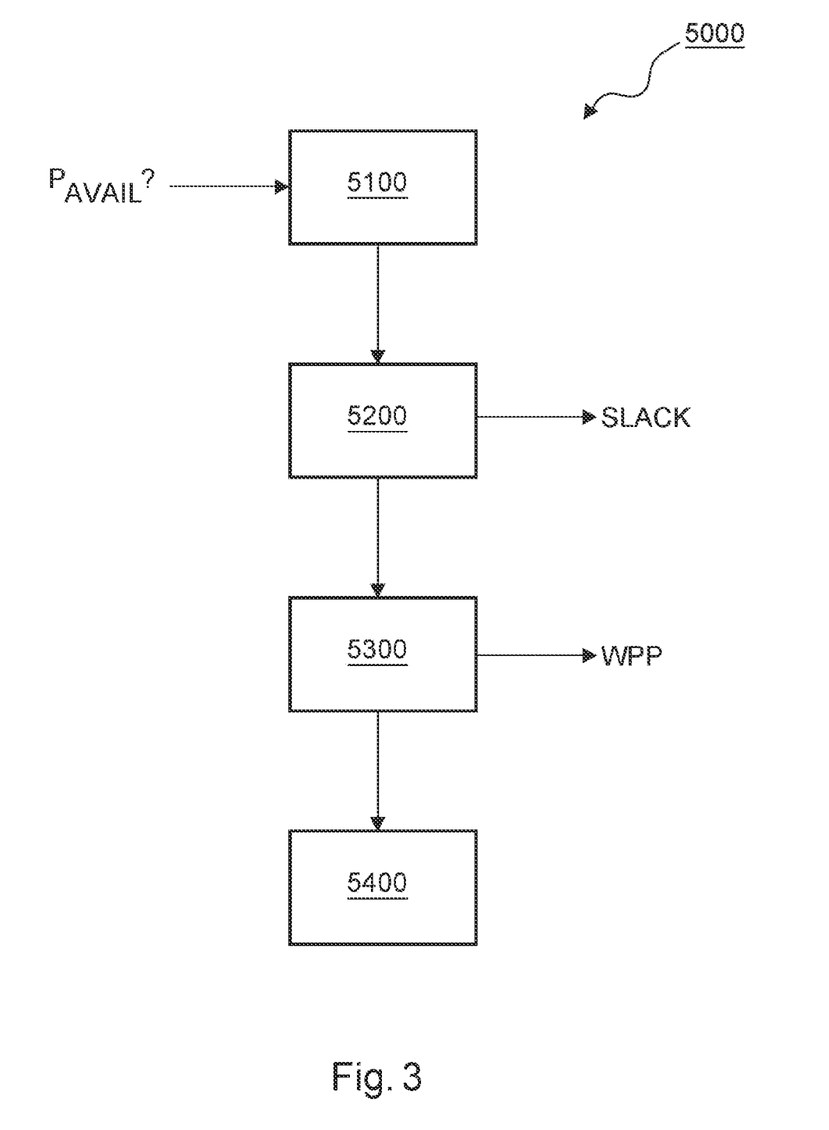
FIG. 3 shows a schematic sequence of a method according to the invention in one embodiment, FIG. 4A schematically shows a control region of an electricity distribution grid.

FIG. 3 shows a schematic sequence of a method 5000 according to the invention for controlling an electricity distribution grid, in particular as shown below in FIGS. 4A to 4D.

In a first step 5100, the grid control center queries the power outputs Pavail available from the wind farms.

In a following step 5200, a control node SLACK is then defined within the control region, in particular by the grid operator, on the basis of the queried available power outputs Pavail.

In a further step 5300, a number of wind farms are then combined at the calculated control node SLACK to form a wind power plant WPP.

It is thus proposed in particular for both the control node SLACK and the power output of the wind power plant WPP to be performed by the grid operator.

The wind power plant WPP is then controlled by way of a wind power plant control unit such that a required voltage quality and/or frequency stability and/or uninterrupted availability is provided in the control region.

The wind power plant control unit thus uses the combined wind farms to form a wind power plant, in particular by way of a wind power plant controller. For this purpose, test and feedback entities are preferably provided within the wind power plant controller, these indicating whether the wind power plant is actually able to be operated properly with the required information. The test and feedback entities are particularly preferably in an online-based form.

Figure 4A:
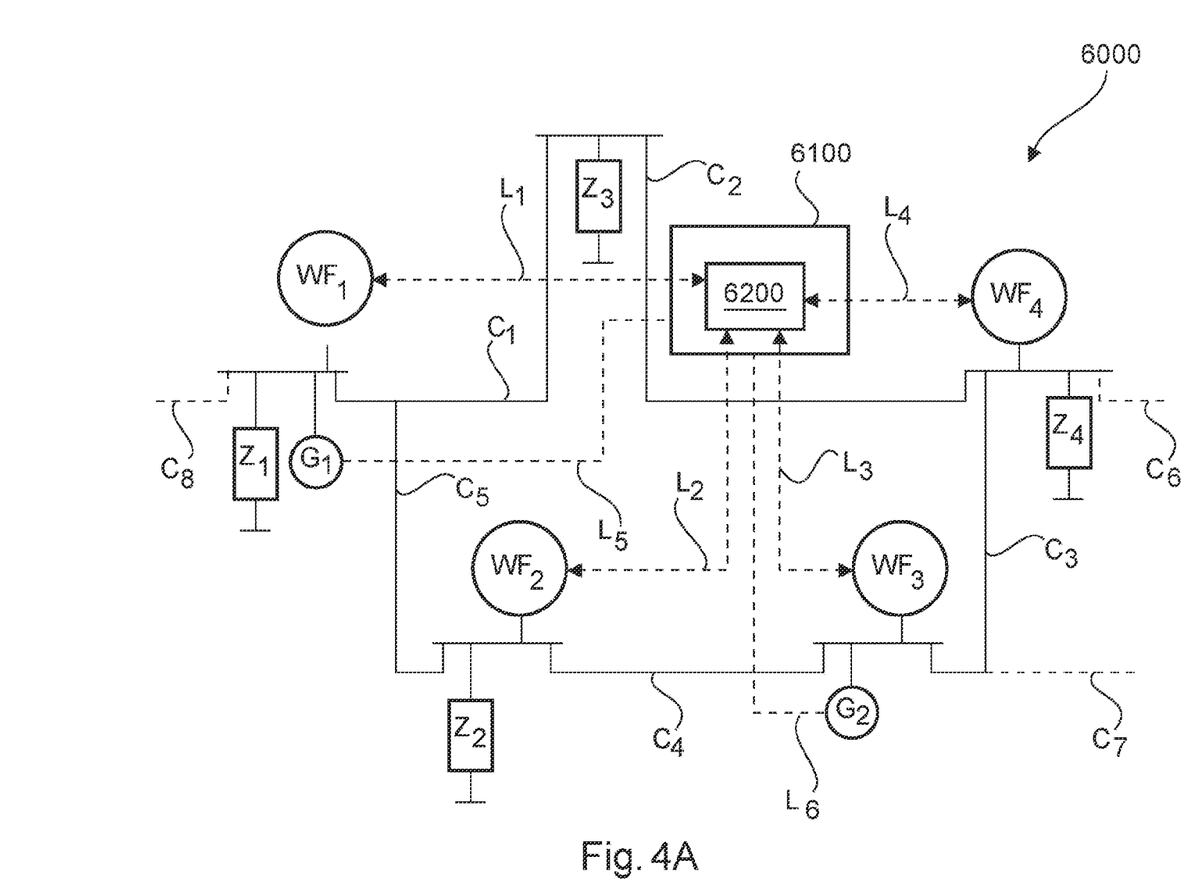

FIG. 4A schematically shows a control region 6000 of an electricity distribution grid, wherein the electricity distribution grid has a grid control center 6100 for controlling the electricity distribution grid.

The control region 6000 comprises a plurality of consumers $Z_1$, $Z_2$, $Z_3$, $Z_4$, generators $G_1$, $G_2$ and wind farms $WF_1$, $WF_2$, $WF_3$, $WF_4$, which are connected to one another via power lines $C_1$, $C_2$, $C_3$, $C_4$, $C_5$.

The control region 6000 is thus part of the electricity distribution grid or may also be the entire electricity distribution grid. If the control region is only part of the electricity distribution grid, the control region contains for example further power lines $C_6$, $C_7$, $C_8$ to other parts of the electricity distribution grid.

The generators $G_1$, $G_2$ are for example conventional power plants, such as for example coal-fired power plants.

The consumers $Z_1$, $Z_2$, $Z_3$, $Z_4$ are for example industrial buildings, residential dwellings and the like.

The wind farms $WF_1$, $WF_2$, $WF_3$, $WF_4$ are preferably wind farms, as shown for example in FIG. 2, wherein the wind farms $WF_1$, $WF_2$, $WF_3$, $WF_4$ are geographically separate from one another.

In order to control the load flow in the electricity distribution grid or to control the electricity distribution grid, the grid control center is connected to the generators, that is to say the generators $G_1$, $G_2$ and the wind farms $WF_1$, $WF_2$, $WF_3$, $WF_4$, by the signal lines $L_1$, $L_2$, $L_3$, $L_4$, $L_5$, $L_6$ so as to convey signals, in particular in order to exchange setpoint values and available power outputs.

In order to carry out the method described above or below, the grid control center 6100 furthermore comprises a wind power plant control unit 6200, which is connected to the wind farms $WF_1$, $WF_2$, $WF_3$, $WF_4$ of the control region by way of the signal lines $L_1$, $L_2$, $L_3$, $L_4$.

Figure 4B:
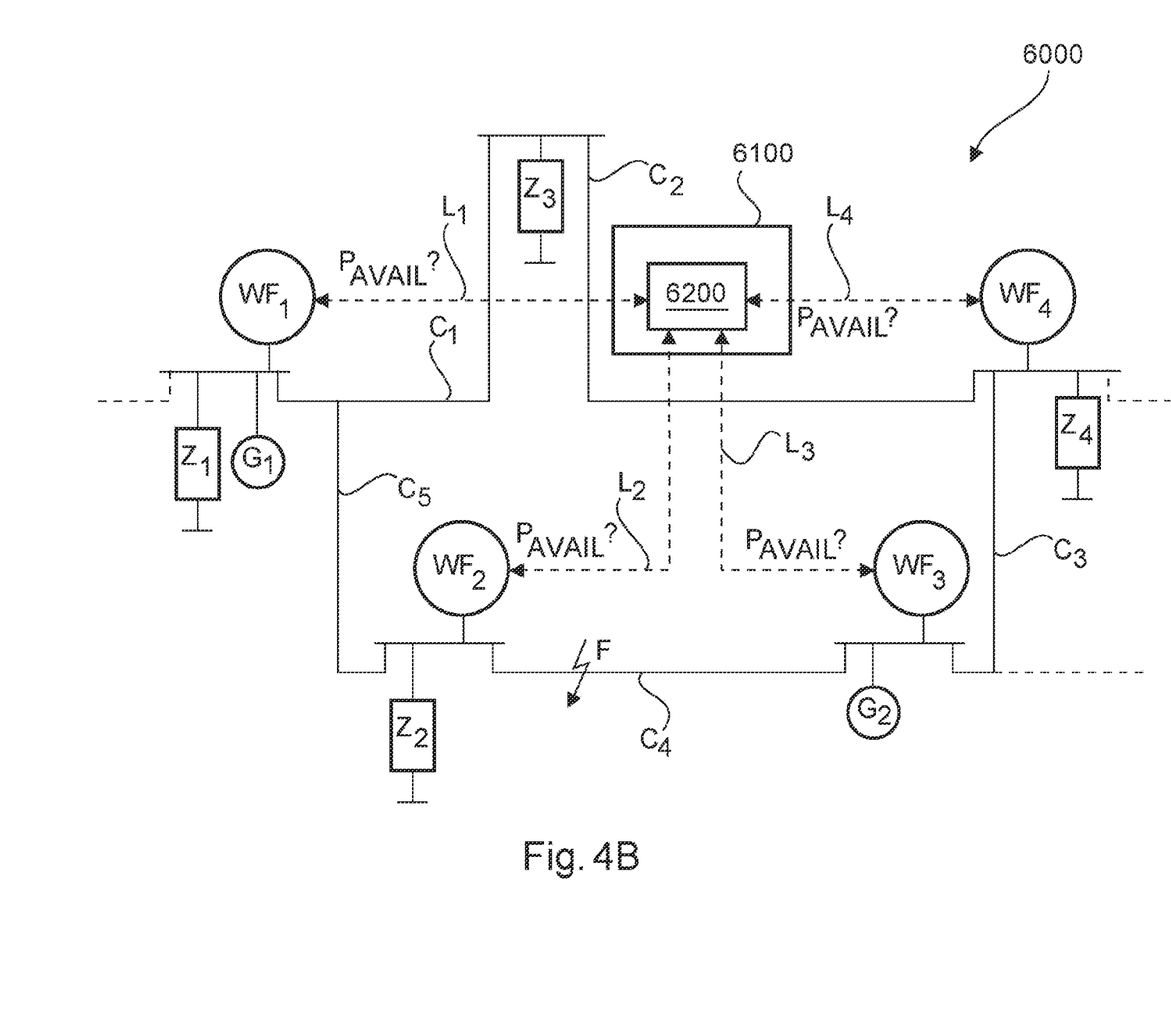
FIG. 4B shows a structure of the wind power plant in an electricity distribution grid, in particular the querying of power outputs available from the wind farms.

FIG. 4B shows a structure of the wind power plant in an electricity distribution grid, as shown in particular in FIG. 4A, in particular the querying of power outputs available from the wind farms, in particular as shown in FIG. 3 with method step 5100.

The control region by way of example contains a fault F on the power line $C_4$, which causes a critical grid situation in the electricity distribution grid.

In response thereto, the grid control center 6100 activates the wind power plant control unit 6200, which queries the power output Pavail available from the wind farms $WF_1$, $WF_2$, $WF_3$, $WF_4$ in the control region 6000 via the signal lines $L_1$, $L_2$, $L_3$, $L_4$.

The wind farms $WF_1$, $WF_2$, $WF_3$, $WF_4$ then report their available power output to the wind power plant control unit 6200 via the signal lines $L_1$, $L_2$, $L_3$, $L_4$.

Figure 4C:
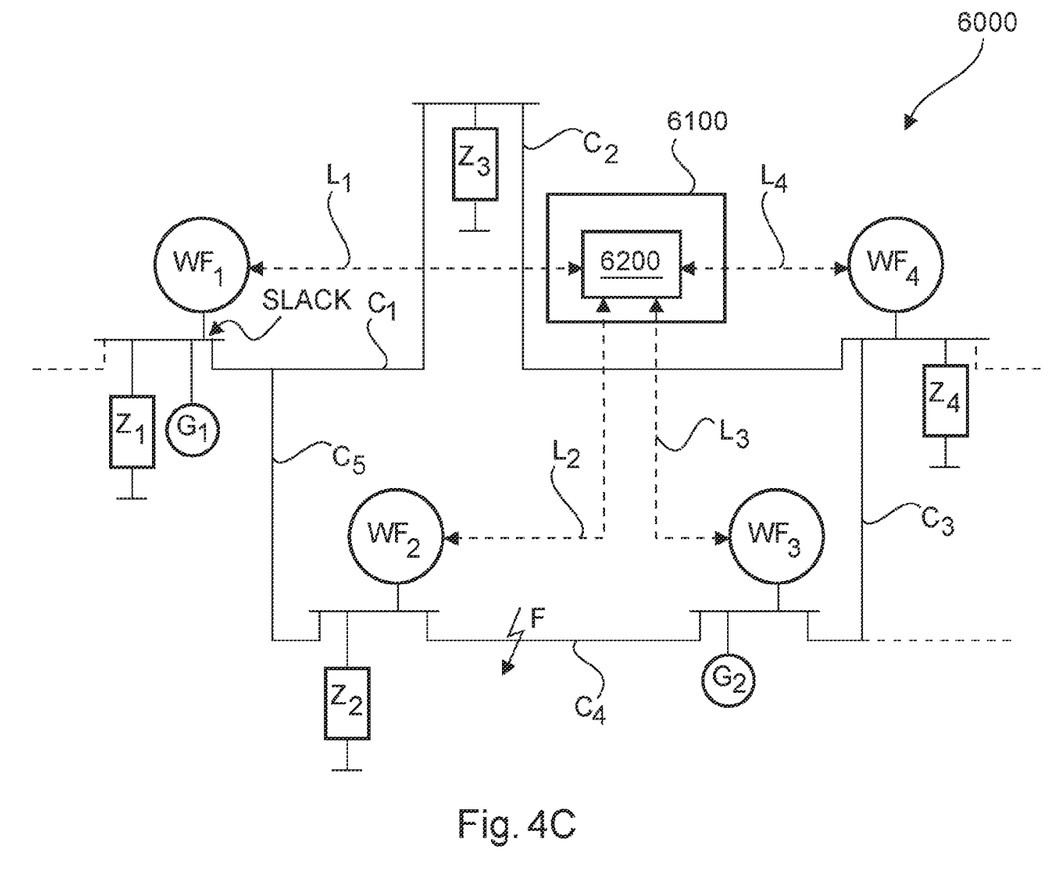
FIG. 4C shows a structure of the wind power plant in an electricity distribution grid, in particular the definition of a control node.

FIG. 4C shows a structure of the wind power plant in an electricity distribution grid, as shown in particular in FIG. 4A, in particular the definition of a control node SLACK, in particular as shown in FIG. 3 with method step 5200.

After the wind power plant control unit 6200 has received the power outputs Pavail available from the wind farms $WF_1$, $WF_2$, $WF_3$, $WF_4$, the wind power plant control unit 6200 calculates a control node SLACK on the basis of the available power outputs.

Figure 4D:
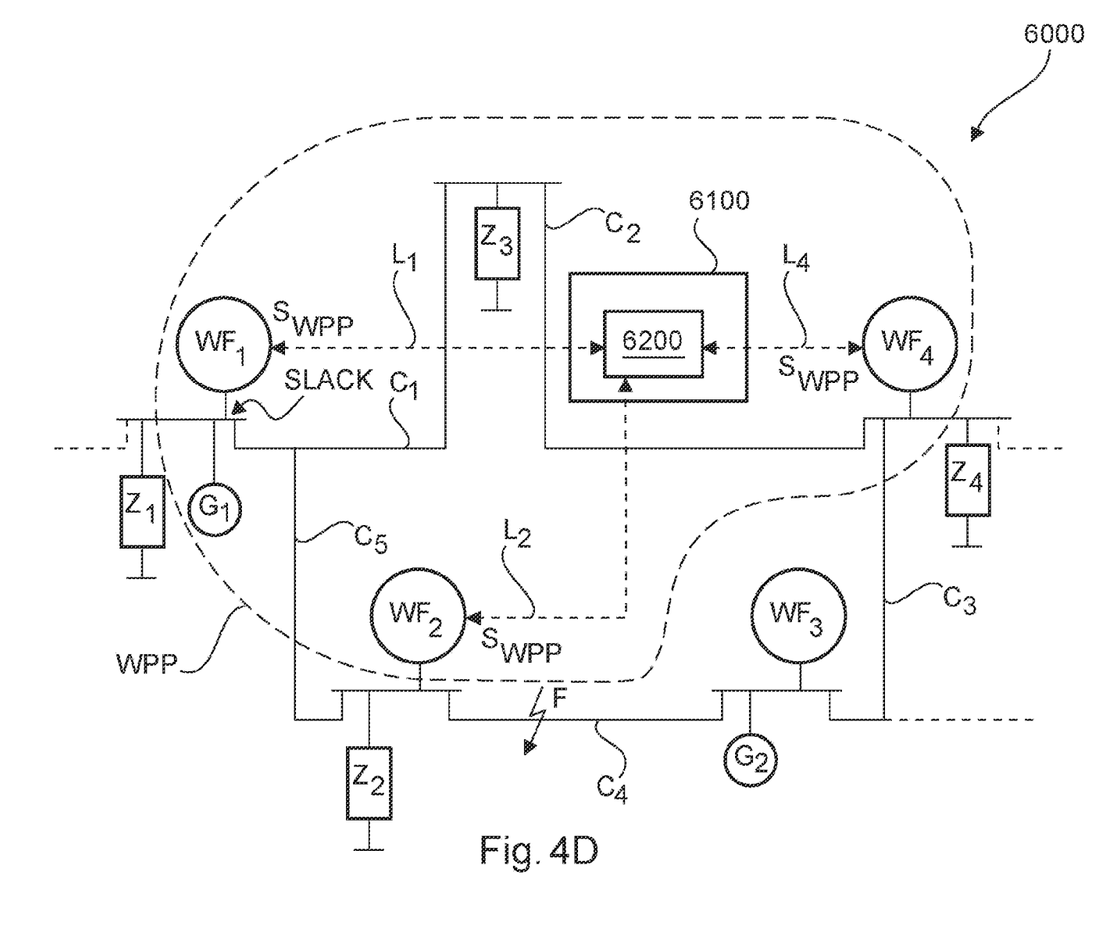
FIG. 4D shows a structure of the wind power plant in an electricity distribution grid, in particular the combination of wind farms to form a wind power plant and subsequent control.

FIG. 4D shows a structure of the wind power plant in an electricity distribution grid, as shown in particular in FIG. 4A, in particular the combination of wind farms $WF_1$, $WF_2$, $WF_4$ to form a wind power plant WPP and subsequent control the wind power plant WPP through setpoint values $S_{WPP}$, in particular as shown in FIG. 3 with method steps 5300 and 5400.

After the wind power plant control unit 6200 has calculated and defined the control node SLACK, the wind farms $WF_1$, $WF_2$, $WF_4$ are dynamically combined to form a functional unit and controlled by the wind power plant control unit 6200.

The wind farms $WF_1$, $WF_2$, $WF_4$, the wind power plant control unit 6200 and the control node thus form the wind power plant, in particular a virtual wind power plant, in relation to the control region.

The structure of this wind power plant WPP is dynamic in this case, that is to say, in the course of the method according to the invention, further wind farms $WF_4$ may be added to the wind power plant or wind farms $WF_1$, $WF_2$, $WF_4$ of the wind power plant may be removed from the wind power plant WPP.

The invention claimed is:

1. A method comprising:
controlling an electricity distribution grid having a nominal grid voltage, wherein a grid control center is coupled to the electricity distribution grid, wherein the electricity distribution grid has a control region that comprises a plurality of wind farms geographically separated from each other, the controlling comprising:
sending one or more requests for available power outputs to the plurality of wind farms;
receiving one or more responses indicating the requested available power outputs from the plurality of wind farms;
defining a control node within the control region, wherein the control node is based on the requested available power outputs;
combining operation of the plurality of wind farms at the control node to form a wind power plant based on the requested available power outputs and a probability distribution of the available power outputs, wherein combining operation of the plurality of wind farms is based on a predefined minimum power output with a minimum availability, wherein the predefined minimum power output depends on a size of the control region; and controlling the wind power plant using a wind power plant controller such that a specified voltage quality, a frequency stability, or an uninterrupted availability, or a combination thereof is provided in the control region,
wherein the control node is defined dynamically, and wherein combining the operation of the plurality of wind farms comprises dynamically combining at the calculated control node to form the wind power plant, and
wherein the requested available output powers include information about the currently available output powers and the probability distribution of available output powers, wherein the probability distribution of available output powers is based in part on a weather forecast.

2. The method as claimed in claim 1, wherein a critical grid situation is a situation from the following list, comprising:
voltage drop,
voltage failure,
transient process,
system split,
underfrequency, and
overfrequency.

3. The method as claimed in claim 1, wherein the electricity distribution grid is controlled to generate a stable voltage in the control area that is between 90 and 110 percent of the nominal grid voltage.

4. The method as claimed in claim 1, wherein:
the wind power plant has a rated power output of at least 250 megawatts (MW) or more, and/or
the wind power plant has at least a forecast actual power output of at least 100 MW.

5. The method as claimed in claim 1, wherein a first wind farm of the plurality of wind farms is at most 100 kilometers (km) cable length away from a second wind farm of the plurality of wind farms.

6. The method as claimed in claim 1, wherein the requested available power outputs are calculated based on at least one weather forecast.

7. The method as claimed in claim 1, wherein combining the operation of the plurality of wind farms to form the wind power plant is based on at least one from the following list, comprising:
a control region status,
a current control region load, and
a location of the control node.

8. The method as claimed claim 1, wherein a quantity of the plurality of wind farms is based on at least one from the following list, comprising:
a control region status,
a control region size,
a current control region load,
a location of the control node, and
based on a wind power plant rated power output.

9. The method as claimed in claim 1, wherein setpoint values are predefined for controlling the wind power plant, comprising at least one from the following list:
active power,
reactive power,
setpoint frequency,
active power/frequency statics,
setpoint voltage, and
reactive power/voltage statics.

10. The method as claimed in claim 6, wherein the available power outputs are calculated using a risk factor of less than 1.

11. A wind farm comprising:
a controller configured to:
receive setpoint values;
send one or more requests for available power outputs to a plurality of wind farms;
receive one or more responses indicating the requested available power outputs from the plurality of wind farms;
define a control node within the control region, wherein the control node is based on the requested available power outputs;
combine operation of the plurality of wind farms at the control node to form a wind power plant based on the requested available power outputs and a probability distribution of the available power outputs, and based on a predefined minimum power output with a minimum availability, wherein the predefined minimum power output depends on a size of the control region; and
control the wind power plant using a wind power plant controller such that a specified voltage quality, a frequency stability, or an uninterrupted availability, or a combination thereof is provided in the control region,
wherein the control node is defined dynamically, and wherein combining the operation of the plurality of wind farms comprises dynamically combining at the calculated control node to form the wind power plant, and
wherein the requested available output powers include information about the currently available output powers and the probability distribution of available output powers, wherein the probability distribution of available output powers is based in part on a weather forecast.

12. The method as claimed in claim 1, wherein the nominal grid voltage is a critical grid situation.

13. The method as claimed in claim 1, wherein combining the operation of the plurality of wind farms at the calculated control node to form the wind power plant comprises dynamically combining the operation of the plurality of wind farms.

14. The method as claimed in claim 1, wherein defining the control node within the control region comprises defining the control node within the control region based on the requested available power outputs.

15. The method as claimed in claim 14, wherein the one or more responses indicating the requested available power outputs are provided to a grid operator.

16. The method as claimed in claim 1, wherein controlling the wind power plant comprises controlling the wind power plant using the grid control center.

* * * * *